Sept. 26, 1961      H. D. KING      3,001,746
TRIPLE PURPOSE PARACHUTE VEHICLE
Filed July 15, 1958      2 Sheets-Sheet 1
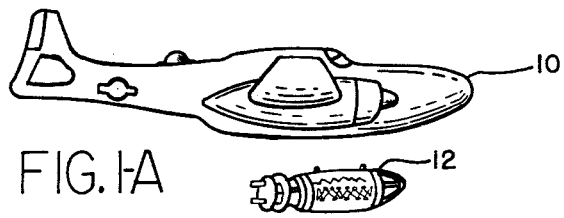
FIG. I-A
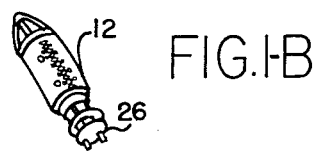
FIG. I-B
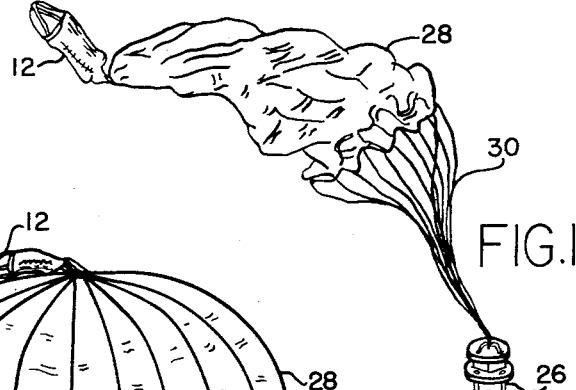
FIG. I-C
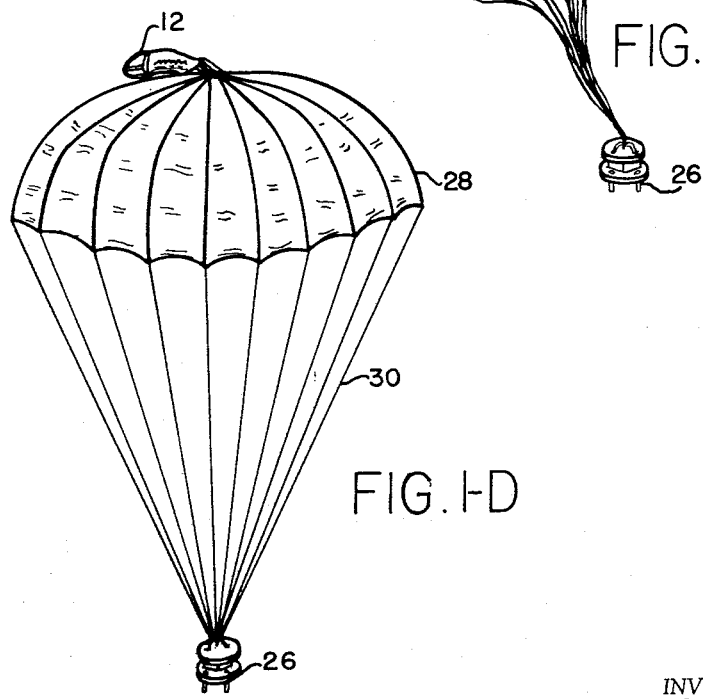
FIG. I-D
INVENTOR.
HERSCHEL D. KING
BY
ATTORNEYS Sept. 26, 1961            H. D. KING            3,001,746

TRIPLE PURPOSE PARACHUTE VEHICLE

Filed July 15, 1958            2 Sheets-Sheet 2

INVENTOR.
HERSCHEL D. KING

3,001,746
TRIPLE PURPOSE PARACHUTE VEHICLE
Herschel D. King, 1103 Juniper, Alamogordo, N. Mex.
Filed July 15, 1958, Ser. No. 748,775
5 Claims. (Cl. 244—149)
(Granted under Title 35, U.S. Code (1952), sec. 266)

The invention described herein may be manufactured and used by or for the United States Government for governmental purposes without payment to me of any royalty thereon.

This invention relates to parachute vehicles or containers and more particularly to a parachute vehicle which serves as a container, a deployment bag and a pilot chute. It is particularly useful in launching a parachute in a given area with the least possible cost in man-hours and materials.

The present practice and equipment for launching a large ring slot metallic chute to a target area requires not only a long and complicated launching procedure but also many items of equipment which separate upon launching and which impact over a wide area. The cost in man-hours and in material is high since much of this equipment cannot readily be recovered. Under present practices eleven pieces of equipment are necessary for successfully launching a target chute of the type referred to above and these eleven pieces of equipment impact the ground at at least three points which generally are very widely spaced.

The present procedure for launching a target chute is relatively complicated. A metallic parachute target vehicle with instrument panel is dropped from the plane. A drag chute is deployed and pulls the lid off the vehicle which releases a bag holding a small pilot chute. The small chute then fills and pulls the large canopy deployment bag from the vehicle. The large ring slot canopy then deploys and the heavy disc deploys the bag containing a pilot chute which is attached to the vehicle. When the pilot chute fills, it pulls away from the heavy disc and floats the vehicle to the ground. The drag chute with the lid, the small pilot chute with the deployment bag from the main chute and the pilot or recovery chute with the metallic vehicle attached impact in different locations usually miles apart and away from the impact area of the main target chute. Recovery of all the various components is practically impossible under such conditions.

One object of the present invention is to provide a launching vehicle which would effectively launch a large ring slot canopy while at the same time insuring that the vehicle and all of the attendant items including the ring slot canopy could be recovered at a single point of impact. To this end, and in accordance with one feature, the present invention contemplates the provision of a container closed at one end and into which the ring slot parachute canopy is folded, a weighted member acting both to close the open end of the container and a weight used in deploying the ring slot parachute, means for releasing said weight after launching and means for connecting the container to the parachute canopy to cause the container to act as a pilot chute for said canopy. With such a construction all of the launching items remain with the main or ring slot parachute and may be recovered at a single point of impact.

It is another object of this invention to provide a simple, practical and inexpensive cloth and webbing vehicle to replace the present metal canister.

It is a further object of this invention to provide a vehicle which is a combination container, deployment bag and pilot chute.

It is a further object of this invention to provide a vehicle which will eliminate the need for the present opening drag chute, the pilot chute and the vehicle recovery chute and the deployment bags for each.

It is a further object to provide a vehicle which will impact with the main canopy thus making recovery of the equipment easier.

It is a further object to provide a vehicle which can be reused many times.

It is a further object to provide a vehicle which will save man-hours now required in packing.

It is a further object to provide a vehicle which is smaller and lighter than the present metal canister to enable a plane to carry more units.

While I have described a vehicle suitable for carrying and deploying a target chute used in military maneuvers I do not wish to limit this invention to such application since it can be used in carrying and deploying a chute for dropping cargo or for any other purpose.

In the accompanying drawings:

FIGS. 1A, 1B, 1C and 1D illustrate the sequence of events in launching a parachute using this invention;

Figure 2:
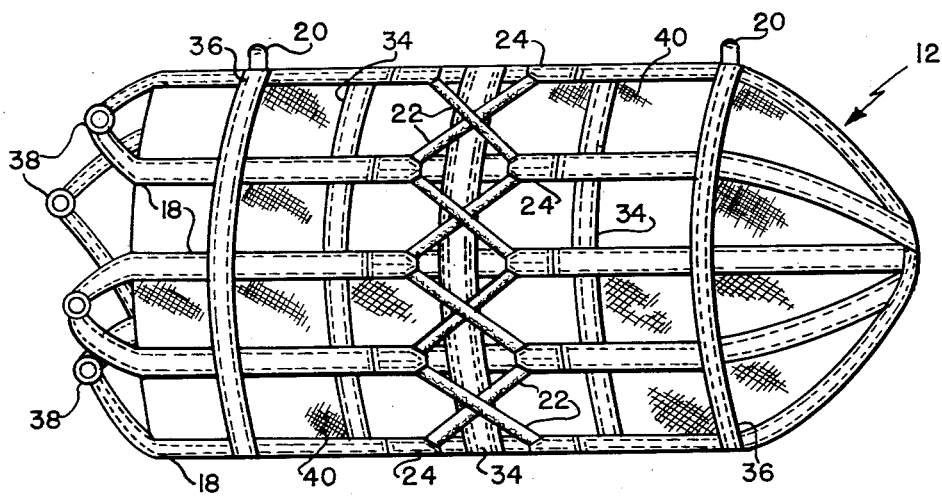
FIG. 2 is a drawing showing the construction of the envelope.

The present practice requires the following equipment to launch a 48-foot ring slot metallic target chute to a target area:

(1) Parachute target vehicle with instrument panel
(2) 16-foot ribbon parachute
(3) 16-foot ribbon parachute deployment bag
(4) 40-pound disc
(5) 48-foot metallic ring slot canopy
(6) 48-foot ring slot deployment bag
(7) 4-foot pilot chute
(8) Vehicle lid
(9) 20.5-foot pilot chute
(10) Vehicle risers
(11) 4-foot pilot chute bag In the sketch, FIG. 1A, an airplane 10 is shown dropping the triple purpose parachute vehicle 12. The cord cutting means 16 (FIG. 3) has cut the cords 14 and the disc 26 is being forced out of the said vehicle 12 by the pressure of the folded parachute 28 and its shrouds 30. In FIG. 1B the disc 26 is shown pulling away from the vehicle 12 and in FIG. 1C the parachute 28 is shown deploying from the said vehicle and in FIG. 1D the parachute 28 is shown fully inflated and floating the disc 26 attached to the said parachute by shrouds 30.

In FIG. 2 the envelope 12 is shown with longitudinal compression tapes 18 laced by bag compression lines 22 through loops 24 made in the said compression tapes. Bomb rack loops 20 are shown held in place by anchor belt tapes 36. Reinforcing belt tapes 34 are shown reinforcing the nylon duck cloth bag sections 40.

Figure 3:
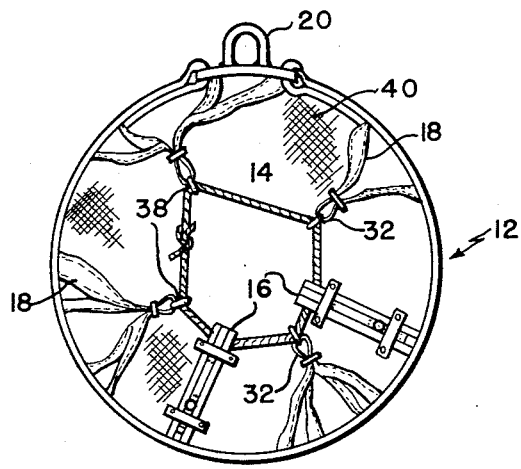
FIG. 3 is an end elevation of the envelope.

In FIG. 3 cord cutters 16 are shown with deployment cords 14 passing through said cutters and through compression tape terminal rings 38 which are held in loops 32 in the said longitudinal compression tapes 18. Essentially, the device consists of a fabric bag made of tough nylon duck cloth reinforced with belt tapes made of strong webbing and longitudinal compression tapes made of the same material. It is subject to very little wear or rough usage since it floats gently to earth attached to the parachute and when recovered it can be used many times. It is economical to make and keep in repair and since it used the 40-pound disc, which in this case is the pay load and might be a flare or an instrument of any kind, as the closure for one end of the vehicle, and uses the resiliency of the compressed nylon parachute and its shrouds to force the contents from the vehicle it requires a minimum of material and components, is simple to use and re-pack and much less expensive than the present metallic canister and its associated equipment.

The sequence of events in launching the same 48-foot target canopy when the cloth and web triple purpose vehicle, which is the subject of this invention, is used, is as follows:

The vehicle is dropped from the plane and four seconds later a powder charge cuts restraining lines holding the disc in place.

The compressed chute and its shrouds then force the 40-pound disc from the vehicle, the vehicle then fills and serves as a pilot chute to deploy the 48-foot canopy. The vehicle is attached to the top of the canopy and impacts with it so that all parts may be recovered together. Only three of the eleven pieces of equipment used in the present system are required for launching the target chute when the triple purpose vehicle is employed. The saving in man-hours in packing the present vehicle, the saving in material and equipment and the possibility of recovery of the various pieces of equipment is obvious. Where recovery is made the present vehicle cannot be depended on for re-use whereas the triple purpose target vehicle is re-usable indefinitely.

The steps for preparing the triple purpose target parachute vehicle for launching a 48-foot target chute are as follows:

(1) Attach lines from vehicle to top of 48-foot canopy
(2) Attach 40-pound disc to 48-foot canopy
(3) Pack 48-foot canopy in vehicle
(4) Close vehicle with 40-pound disc and tie deployment cord
(5) Lace vehicle with lines or tape through loops in longitudinal compression tapes to compress vehicle and contents.

It is evident from the above that the present invention supplies a simple, inexpensive vehicle for packing a target chute and at the same time utilizing the vehicle and the other components in such a manner that recovery of all of the components is facilitated.

Having thus described my invention, what I claim as new and desire to secure by Letters Patent of the United States is:

1. In a parachute vehicle having in combination a container closed at one end, a folded parachute packed therein, a weighted member secured to said parachute for closing the open end of said container, means for securing said weighted member in container closing position, means acting on said container for reducing its volume for longitudinally compressing said parachute in said container, and means on said securing means for severing said securing means at a predetermined interval of time after launching to allow the pressure of said compressed parachute to force the said weighted member from said vehicle to deploy said parachute.

2. In a parachute vehicle having in combination a container closed at one end, a folded parachute packed therein, a weighted member for closing the open end of said container, means for securing said weighted member in container closing position, means on said container for reducing its volume longitudinally compressing said parachute in said container, means on said securing means for severing said securing means at a predetermined interval of time after launching to allow the pressure of said compressed parachute to force the said weighted member from said vehicle, means securing said weighted member to said parachute to remove said parachute from said vehicle, and means for connecting said parachute to said container and arranged to cause the container to act as a pilot chute to deploy said parachute.

3. In a parachute vehicle a cloth sack closed at one end to hold a folded parachute, a metal disc attached to said parachute closing the open end of said sack, restraining cords attached to said sack holding said metal disc in sack closing position, cutting means to sever said restraining cords to release said disc after a predetermined lapse of time, compression means to compress said container and said folded parachute to force said disc from said vehicle upon the cutting of said restraining cords, and means for connecting said sack to said parachute to permit said sack to act as a pilot chute to deploy said parachute.

4. A vehicle for parachutes in the form of a cyindrical cloth container consisting of a fore part forming a closed end, a rear part overlapping the fore part forming an open end of said container, a folded parachute secured to said rear part of said container and packed therein, a metal disc closing the open end of said container and secured to said parachute, tie cords holding said disc in position, loops adjacent the overlapping portion of said fore and rear parts, cords through said loops compressing said container and the parachute in said container, and cutting means to sever the tie cords holding said disc in position a predetermined interval of time after launching to permit said compressed parachute to force said disc from said container, said container to act as a pilot chute to deploy said parachute.

5. The combination of a parachute to be launched and a parachute container comprising a parachute, a cylindrical cloth container having a closed end and an open end, means for securing said parachute to the open end of said container, said parachute being packed therein, a weighted metal disc closing the open end of said container and secured to said parachute, tie cords in the open end of said container for holding said metal disc in position, a pair of series of loops transversely disposed around said container in a longitudinally spaced relationship, cords through said loops for compressing said container thereby compressing said parachute in said container, and cutting means to sever said tie cords holding said disc in position to permit said compressed parachute to force said disc from said container, said container acting as a pilot chute to deploy said parachute.

References Cited in the file of this patent

UNITED STATES PATENTS

| | | |
|---|---|---|
| 1,354,225 | Smith | Sept. 28, 1920 |
| 1,859,185 | Switlik | May 17, 1932 |
| 2,581,645 | Frieder et al. | Jan. 8, 1952 |
| 2,593,432 | Freas | Apr. 22, 1952 |
| 2,780,428 | Moran | Feb. 5, 1957 |

FOREIGN PATENTS

| | | |
|---|---|---|
| 69,934 | Sweden | July 29, 1930 |